July 31, 1962 H. POLAK 3,047,483
NUCLEAR ENERGY REACTORS
Original Filed July 6, 1956 7 Sheets-Sheet 1

INVENTOR.
Henri Polak
BY Ooms, MacDougall,
Williams & Hersh
Attorneys

July 31, 1962  H. POLAK  3,047,483
NUCLEAR ENERGY REACTORS
Original Filed July 6, 1956  7 Sheets-Sheet 2

INVENTOR.
Henri Polak
BY Ooms, McDougall,
Williams & Hersh
Attorneys

July 31, 1962 — H. POLAK — 3,047,483
NUCLEAR ENERGY REACTORS
Original Filed July 6, 1956 — 7 Sheets-Sheet 3

COOLANT FLOW

INVENTOR.
Henri Polak
BY
Attorneys

July 31, 1962  H. POLAK  3,047,483
NUCLEAR ENERGY REACTORS
Original Filed July 6, 1956  7 Sheets-Sheet 4

▒ FUEL
▨ STRUCTURAL
〰 COOLANT

INVENTOR.
Henri Polak
BY Ooms, McDougall,
Williams & Hersh
Attorneys

July 31, 1962   H. POLAK   3,047,483
NUCLEAR ENERGY REACTORS

Original Filed July 6, 1956   7 Sheets-Sheet 5

INVENTOR.
Henri Polak
BY Ooms, McDougall,
Williams & Hersh
Attorneys

July 31, 1962 H. POLAK 3,047,483
NUCLEAR ENERGY REACTORS
Original Filed July 6, 1956 7 Sheets-Sheet 6

INVENTOR.
Henri Polak
BY Ooms, McDougall,
Williams & Hersh
Attorneys

July 31, 1962 — H. POLAK — 3,047,483
NUCLEAR ENERGY REACTORS
Original Filed July 6, 1956 — 7 Sheets-Sheet 7

INVENTOR.
Henri Polak
BY Ooms, McDougall,
Williams & Hersh
Attorneys 3,047,483
NUCLEAR ENERGY REACTORS
Henri Polak, 19 Chemin de Fossard, Geneva, Switzerland
Continuation of abandoned application Ser. No. 596,326, July 6, 1956. This application Oct. 6, 1960, Ser. No. 61,034
5 Claims. (Cl. 204—193.2)

This invention deals with the internal structure of nuclear reactors, the invention being useful both in reactors of the type utilizing thermal neutrons and of the so-called fast-neutron type.

In both types of reactors, nuclear energy is released in a chain reaction wherein neutrons freed as the result of nuclear fissions in the fuel substance are employed to produce fissions of other atoms of the fuel. Maintenance of the chain reaction requires good neutron economy in the reaction zone, which means that that zone should be left relatively free of substances tending to absorb free neutrons.

Removal of the generated heat of reaction, which constitutes the principal useful energy output of the reactor, requires, on the other hand, that some suitable heat-exchange medium be circulated through or around the reaction zone.

The energy output of the reactor is limited in large measure by the speed and efficiency with which the heat of reaction can be removed. The best coolants are liquids, but unfortunately in many cases the materials which make good coolants are also "poisonous" to the nuclear reaction, that is, they absorb free neutrons and hence tend to inhibit the chain reaction. This is particularly true of thermal-neutron reactors.

In most prior-art reactors, therefore, a compromise has had to be struck between favorable neutron economy and effective heat removal and utilization.

One method of achieving heat removal without introducing neutron-absorbing materials into the reaction zone is to use nuclear fuel prepared in liquid form and circulate it between the reaction zone and an outside heat exchanger. This method is frequently referred to as external cooling. It has its practical difficulties, however, particularly in the pumping of very hot, highly radioactive liquids, which is not easy to do on a continuous basis.

The major object of the present invention is to provide a reactor in which the fuel itself provides the means of heat transfer from the reaction zone to the cooling zone, without any of the problems encountered when the fuel is prepared as a free, relatively unconfined liquid. This object is achieved in my invention by designing the fuel-bearing elements in suitable shape and then rotating them systematically so that each portion of the fuel passes alternately through the reaction zone and through a cooling zone. By shaping the fuel elements to possess substantially axial symmetry, I achieve continuous energy release and heat transfer at a constant rate, even though each differential volume of fuel is passing alternately between reaction conditions and cooling conditions.

In a preferred form of my invention for thermal reactors, a rotary fuel assembly is employed, consisting of a number of parallel disc-shaped circular fuel-bearing plates mounted on a shaft rotated at a constant rate, whereby said fuel plates successively move through a region substantially filled with a suitable moderator, and another region largely filled with coolant, the geometric and nuclear parameters being selected in such manner that the self-supporting chain reaction is substantially confined to the moderating region. The fission heat generated within the fuel discs by the chain reaction is mechanically removed into the cooling zone by the rotation of the discs themselves.

In addition to an outer reflector or blanket, surrounding both the chain-reacting and cooling regions, an internal separator or internal reflector may be situated around the reacting zone (the so-called inner core), slots being provided therein to accommodate the individual fuel discs and permit their rotation. Preferably the geometry of the construction is so chosen that the cooling phase for any given volume of fuel lasts longer than the reaction phase. Such design improves the efficiency of heat transfer.

In my invention a coolant with high mass number, and therefore poor slowing-down power, is not only permissible, but often even desirable, since the use of such a coolant will improve the effectiveness of the interruption of the chain reaction in the cooling zone.

In the case of fast reactors, and in particular fast breeders, the design considerations are somewhat different from those in thermal reactors, with the result that my invention is best employed with another type of core arrangement. In such reactors, however, my invention, employing rotary fuel-bearing assemblies, offers great advantages over prior-art designs.

In breeder reactors, any degradation of the neutron spectrum results in an increase of the capture-to-fission ratio. Furthermore, the fast-fission bonus contributed by the fertile material reaches attractive proportions at high neutron energies. Therefore it is highly desirable to avoid appreciable slowing down of the neutrons in both inelastic and elastic collisions.

In any fast-neutron reactor the fuel should contain a large proportion of fissionable material with the lowest possible dilution by non-fissionable atoms, other than fertile atoms in a breeder reactor. As a result of this design requirement, the core of a fast reactor is usually small, providing a small heat transfer area and thus making speedy removal of heat by a coolant particularly difficult.

Thus in practice the power of a fast reactor is limited by the possible rate of heat removal. The doubling time in a fast breeder reactor being inversely proportional to the specific power, such a reactor will be preferably run at the maximum permissible power levels, and it is, therefore, of essential importance that the heat removal rate be raised to its possible maximum.

Since the flux and power generation generally show a strong maximum in the central region of the core, relatively more heat has to be removed from this region than from the surrounding zone. If this is achieved by an increase of the coolant proportion within the central zone, an additional factor of dilution is introduced, which softens the neutron spectrum. Thus generally a compromise between central core specific power and fast-neutron energy level must be made.

Another major object of the present invention is to provide a fast-neutron reactor in which such a compromise in design is avoided. According to my invention, removal of heat from the high power-density region of the core is accomplished by the use of two interlocking sets of rotating disc-shaped fuel elements. The heat of fission developed within them, in the main reactive zone of mutual overlap, is removed mechanically, by the disc rotation, from this inner core into adjoining cooling zones which encompass the outer portions of the discs. In this way the inner core region remains essentially undiluted with coolant, except for small quantities in the clearances between adjoining discs.

The outer core area or cooling zone, on the other hand, is not only greatly diluted by coolant, but also contains many fewer fissile atoms per unit volume than the inner region. Hence the neutron flux and power generation will remain largely restricted to the inner zone which the discs of fuel overlap.

An internal separating reflector may, if desired, be located immediately around the zone of overlap, slots being provided to accommodate the rotating fuel discs, as previously described with respect to the thermal reactor form of my invention.

The temperature distribution along the two fuel-containing plate assemblies will be essentially flat, in contrast with the distribution of heat produced, which will show a marked maximum in the inner core where the discs overlap. The coolant should preferably not, by acting as a moderator, contribute noticeably to the overall reactivity, and it should, therefore, have a high mass number. It may, moreover, contain part or all of the fertile material, in cases wherein the reactor is being used for breeding as well as energy production. The geometry of the system as just described provides, for any given volume segment of the fuel discs, a considerably longer cooling period than reacting period during each rotation. This will, of course, facilitate heat transfer.

In both thermal and fast reactors constructed according to my invention, the fuel itself may, during operation, be in the form of liquid metal or alloy encapsulated within hollow disc-shaped fuel-containing elements having temperature-resistant structural walls, the fuel being held in the outer portions of the discs by the centrifugal force caused by rotation. Mounting of the fuel assembly shafts in a vertical position and providing a slight internal taper in the disc walls make possible the filling and emptying of the discs with liquid fuel merely by raising or lowering the overall fuel level in a system of communicating vessels. If excess fuel in the center shaft is drained off during operation, the fuel discs will empty themselves into the center shaft region as soon as their rotation is interrupted or slowed down.

This constitutes an important feature of self-quenching in cases of failure of rotation. Hence another object of my invention is to provide an added factor of safety in nuclear reactors.

Quite apart from the above-mentioned advantages of rotating fuel disc assemblies for the physical separation of chain reaction and cooling functions, these assemblies offer two distinct additional advantages, to be considered as further objects of this invention.

In the first place, it is possible to let the rotary fuel assembly furnish part or all of the pumping power necessary to propel the primary coolant through its circuit at the required rate. This can either be effected by mere utilization of the tangential drag forces of the fuel discs upon the coolant, or by employing the radial centrifugal forces which act upon the coolant as it is whirled around by the rotating discs.

In the second place, when liquid metallic fuel is carried in rotary fuel discs, the centrifugal forces will tend to separate the relatively light fission products from the heavier fissile and fertile atoms, and the fission products will accumulate close to the axis of rotation. This makes possible continuous withdrawal of fission products during reactor operation, a very important practical advantage. At the same time this construction, by keeping fission product contamination at all times low, permits a design having less excess reactivity, and the inherent safety of the reactor is correspondingly increased.

The objects above described and further advantages obtainable with this invention are explained and illustrated for the appended drawings and the following detailed discussion of the illustrative embodiments of the invention therein disclosed.

This application is a continuation of application S.N. 596,326, filed July 6, 1956, now abandoned.

The various figures of the drawing may be briefly described as follows.

Figure 1:
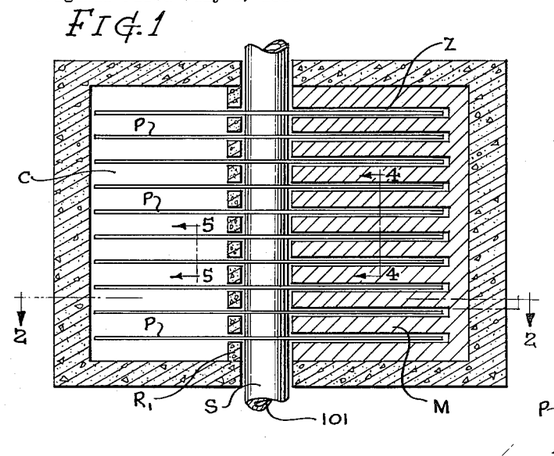
FIGURE 1 is a diagrammatic cross section of a core assembly for a thermal-neutron reactor with separated reacting and cooling regions, according to the invention.
Figure 2:
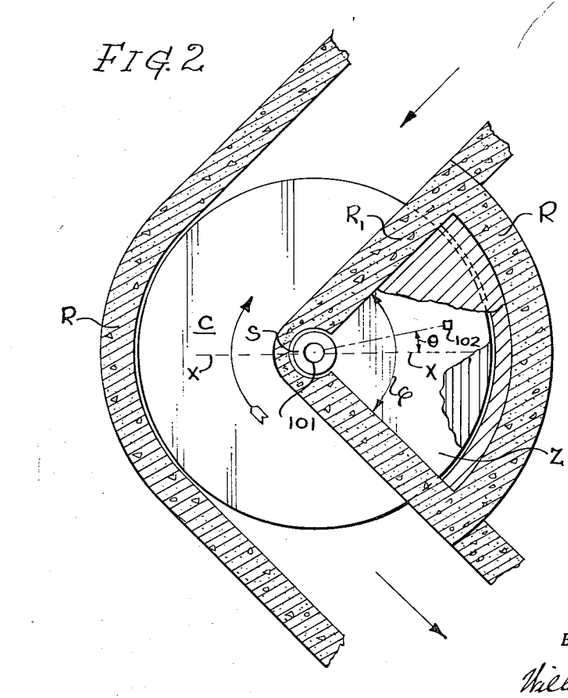
FIGURE 2 is a diagrammatic cross section of the FIGURE 1 structure, the section being along the line 2—2 of FIGURE 1.
Figure 3:
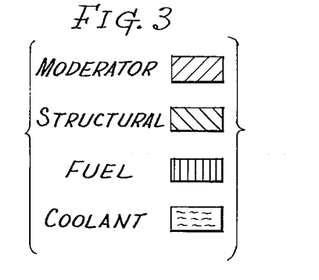
FIGURE 3 shows the shading code used in FIGURES 1–10.

In FIGURES 1 and 2 the shaft S carries a number of circular fuel-bearing plates or discs P, which are interspersed by the moderator M in the reacting zone. Both cooling region C and reacting region Z are enclosed by the neutron reflector R, with suitable shaft seals for the fuel assembly shaft S or a canned motor or rotor arrangement.

An inner reflector $R_1$ separates the reacting zone and the cooling zone and is provided with slots to permit rotation of the discs which form the fuel assembly. The fuel proper is protected from corrosion and other damage by cladding, canning or other known means of support and containment. In case a powdered fuel material such as oxide, hydride, carbide, etc. is employed, the canning may be limited to the outer faces and rim of the discs while the inner rim may remain partly open and lead into a cavity 101 within the shaft S through which gaseous fission products or their decay products such as xenon 135 may be removed. This open inner rim arrangement will also facilitate the introduction and withdrawal of the powdered fuel into the discs, while it offers freedom for thermal and other expansions occurring during operation. The powdered fuel will remain evenly compacted towards the outer rim throughout the disc under the influence of centrifugal forces resulting from the rotation.

Figure 4:
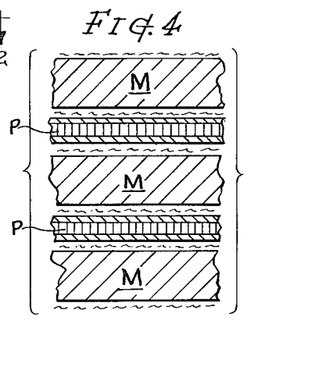
FIGURE 4 is diagrammatic sectional view showing typical relative dimensions of the fuel element, coolant and moderator geometry within the inner core of the FIGURE 1 reactor.
Figure 5:
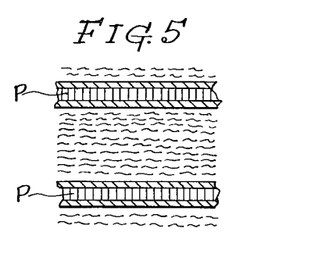
FIGURE 5 is a similar view showing typical geometry in the cooling region of the reactor of FIGURE 1.

The reacting zone covers an angle $\phi$ as shown in FIGURE 2, while the cooling region may cover the remainder of the arc minus the angle occupied by the inner reflector $R_1$. In the zone Z the space between neighboring discs is, except for small clearance, almost entirely occupied by moderator, as shown in FIGURE 4, while in the cooling zone there is ample space for coolant flow as indicated in FIGURE 5.

Starting from the center line X in FIGURE 2, we shall now follow a small element 102 of a fuel disc and describe the way in which temperature, neutron flux, and power generation vary in it as a function of angular position $\theta$, or, since the angular rate of rotation is assumed to be constant, as a function of time.

Figure 6:
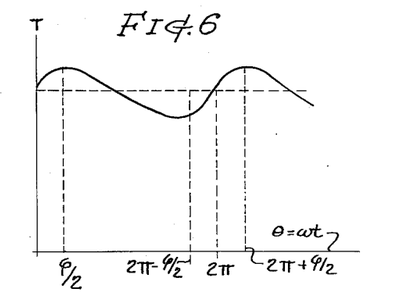
FIGURE 6 gives qualitative curves for the temperature of a specific element of a fuel disc of the reactor of FIGURE 1, as it rotates at a constant rate in a steady-state condition.
Figure 7:
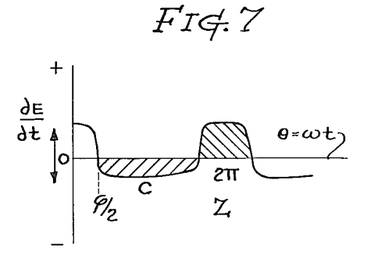
FIGURE 7 shows a qualitative curve of energy gain or loss of a specific small portion of a fuel disc of the reactor of FIGURE 1, as it rotates at a constant rate in a steady-state condition.

Going in counterclockwise direction, the selected element 102 moves away from the center line X of the reacting zone. The neutron flux falls off gradually as does the power generated within the fuel. Since there is little circulation of coolant within this region, the temperature will continue to rise but at a decreasing rate, until the element emerges from the inner core Z into the cooling region C. At that time the flux falls off rapidly, remaining at a very low value throughout the cooling zone, as does the power generated. The temperature starts to decrease as soon as the chosen element is in contact with the coolant, and, once a steady-state condition is reached, the total temperature drop in the cooling region equals the total temperature rise in the reacting zone. Upon re-entering the inner core or reacting zone, the selected element of fuel 102 again experiences increased neutron flux and higher temperature. The above-described phenomena are indicated graphically in FIGURES 6 and 7.

Figure 8:
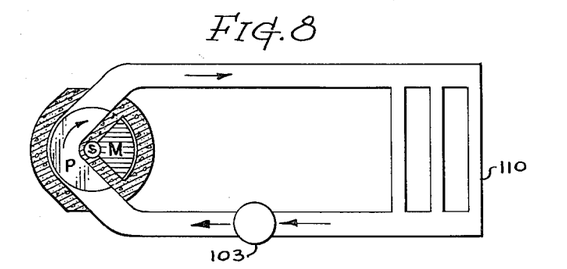
FIGURE 8 is a diagrammatic flow diagram of a thermal-neutron reactor made according to the teaching of FIGURE 1, in which the circulation of liquid coolant is aided by the tangential drag-pumping effect of the rotary fuel discs.

FIGURE 8 shows how the rotation of the fuel discs P can be utilized as a main or auxiliary source of pumping power for circulating, by means of tangential drag, the primary coolant through its circuit. If necessary, additional pumping power may be provided by using a pump 103 in the external circuit.

Figure 9:
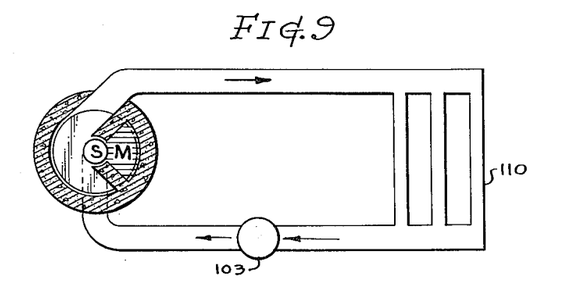
FIGURE 9 is a diagrammatic flow diagram of a thermal-neutron reactor made according to the teaching of FIGURE 1, in which the circulation is aided by the centrifugal pumping effect of the rotary fuel discs.
Figure 21:
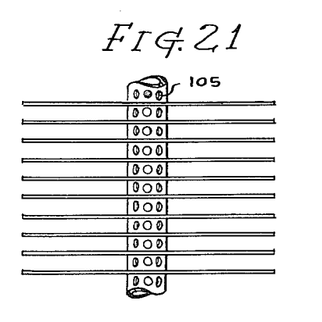
FIGURE 21 is a side view of a typical fuel disc assembly with coolant flow through the hollow shaft as employed in the suggested reactors of both FIGURE 9 and FIGURE 20.

Alternately, as shown in FIGURE 9, this can be effected by utilizing centrifugal forces set up by the disc rotation. The coolant in the FIGURE 9 structure is introduced through apertures 105 in the hollow shaft S, located between the individual fuel discs as shown in FIGURE 21.

In both the FIGURE 8 and FIGURE 9 arrangements the heat exchanger 110 transfers heat energy in the coolant to a secondary circuit.

Figure 10:
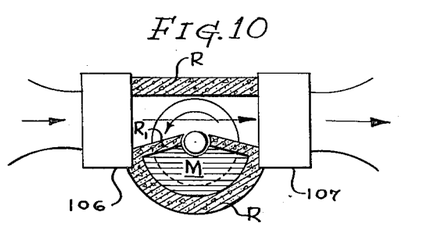
FIGURE 10 is a fragmentary diagrammatic view of a thermal-neutron reactor turbine power plant according to the principle of FIGURE 1, employing a gaseous working medium which is heated by contact with the fuel discs.

The relatively wide space between the fuel discs in the cooling zone available in my invention for the flow of coolant permits the use of gaseous cooling without much resistance to the gas flow. A suggested application in an open cycle hot-air turbine power plant is indicated in FIGURE 10, in which the gas is compressed in compressor 106, heated in the reactor, and then fed to turbine 107, wherein the thermal energy in the gas is partially converted to mechanical energy.

Figure 11:
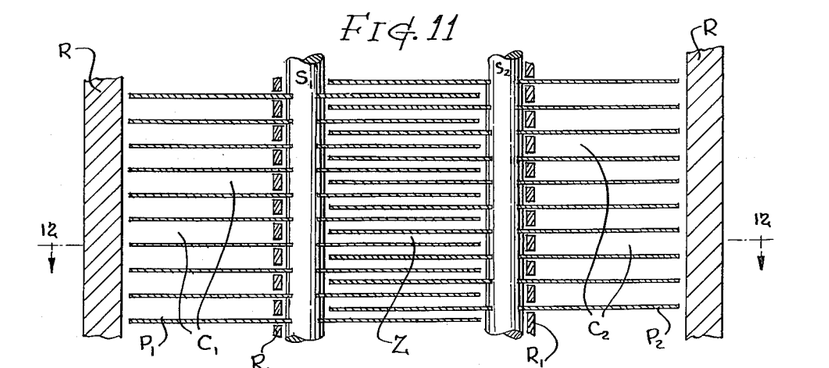
FIGURE 11 is a diagrammatic central cross section of a core assembly for a fast-neutron reactor according to the invention, the section being taken along its principal plane of symmetry, showing the overlapping sets of fuel discs.
Figure 12:
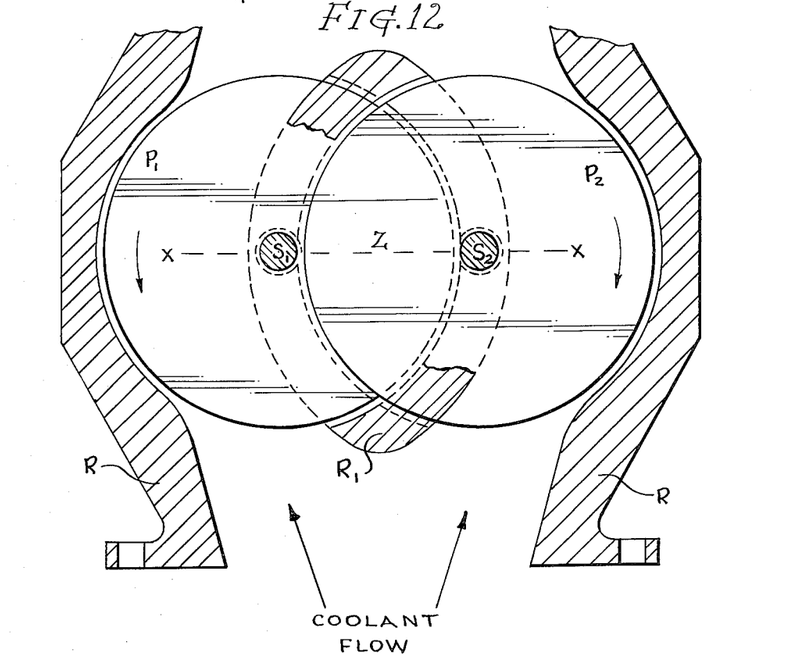
FIGURE 12 is a diagrammatic central cross section of the FIGURE 11 structure, the section being taken along the line 12—12 of FIGURE 11.

In the fast reactor of FIGURES 11 and 12, the fuel discs $P_1$ and $P_2$ contain the appropriate amount of fissile material to sustain at the chosen physical and geometric conditions a fast-neutron chain reaction largely restricted to the zone of overlap Z, called the inner core. In addition, if the reactor is of the breeder type, the discs will contain fertile material capable of being transformed into fissile material by neutron capture.

The fuel containing fissile and perhaps fertile material is suitably protected from damage by corrosion and other disruptive influences by any suitable means, such as cladding or canning. During operation at elevated temperatures the fuel may be in the liquid phase, kept distributed uniformly within the disc walls by the centrifugal forces of rotation.

Cooling of the fuel discs is achieved by contact with a liquid or gaseous coolant which circulates through the space between the reflector walls R. The cooling is mainly confined to the outer core zones $C_1$ and $C_2$, although small amounts of coolant will flow through the inner core zone Z, filling the clearances between adjoining fuel discs and carrying off some excess heat. The reflector or blanket R surrounds the entire dual assembly as shown. An additional reflector $R_1$ may enclose the reaction zone Z if desired, being slotted as shown in FIGURE 11 to accommodate the rotating fuel discs.

A fertile material may be incorporated in the reflectors or in the coolant as well as in the fuel discs themselves. Rotation of the two fuel-disc assemblies can either be effected by leading the two shafts $S_1$ and $S_2$ out of the core vessel through a suitable coolant seal, or by a suitable canned motor or rotor arrangement.

Nuclear control may be provided by control rods, positioned for example at points B and C (FIGURE 13) or within the shafts $S_1$ and $S_2$, by variable reflector or blanket geometry, or by variable spacing between the fuel assembly shafts $S_1$ and $S_2$, which alters the dimensions of the inner core. An additional control or adjustment of heat transfer is provided by the choice of rotational rate of the fuel-disc assemblies. At high rates of rotation the temperature range experienced by the fuel discs will be reduced, and the disruptive effects on the fuel discs of heat cycling will be correspondingly reduced.

The coolant flow may be directed opposite to the rotation of the fuel discs in order to increase heat transfer efficiency, as indicated in FIGURE 12.

Figure 13:
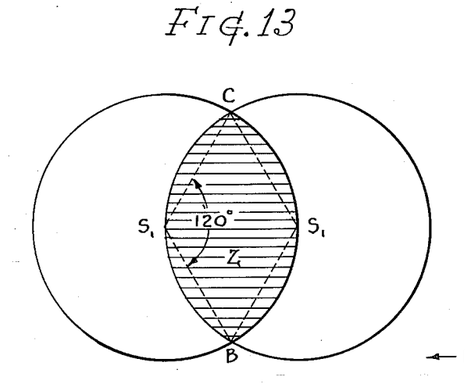
FIGURE 13 sketches the basic geometry of inner and outer core of the reactor illustrated in FIGURE 11 in an idealized situation for zero shaft thickness.
Figure 14:
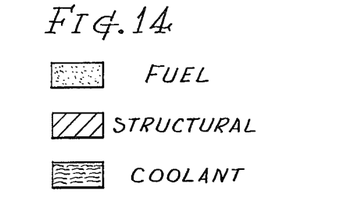
FIGURE 14 shows the shading code used in FIGURES 11–15.

In FIGURE 13 it is shown that for the hypothetical case of zero shaft diameter the maximum overlapping zone, which is the principal reaction zone, can encompass about 120 degrees of each set of discs. For practical dimensions of the shafts $S_1$ and $S_2$ the inner core region Z can be considered as covering approximately one-third of the disc. As a result of this, the cooling portion of each disc is roughly twice the reacting portion and, therefore, for any selected element of a fuel disc, rotating at a constant rate, the heat-removal part of each cycle lasts twice as long the heat-generation phase. This tends to improve the rate of heat removal to a considerable degree without necessitating higher fuel element temperatures.

Figure 15:
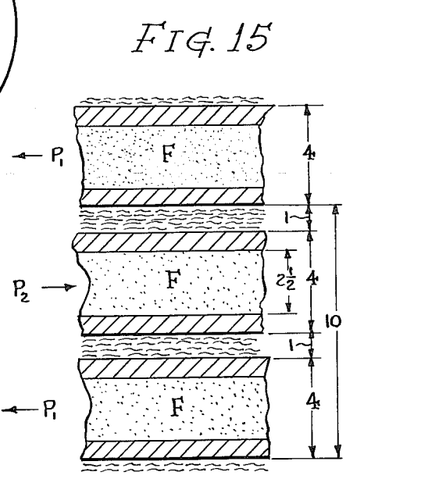
FIGURE 15 is a diagrammatic section showing typical fuel element and coolant geometry within the inner core of the fast reactor of FIGURE 11.

As an example of possible dimensions of actual fast reactor fuel assemblies, FIGURE 15 shows the geometry of part of the reacting zone for a typical core. In the case illustrated the fuel layer F of 2½ millimeter thickness is enclosed between structural walls of ¾ millimeter, consisting of high temperature and corrosion-resistant material with a low absorption cross section for fast neutrons and a high mass number to avoid moderation of the neutrons. The total thickness of the individual discs is, therefore, 4 millimeters. If these discs are mounted at 10 millimeter intervals between centers, the space between them is 6 millimeters, and, therefore, in the overlapping zone the clearances between adjoining discs are 1 millimeter. The average composition of the overlapping zone is therefore:

| | Percent |
|---|---|
| Fuel | 50 |
| Structural | 30 |
| Coolant | 20 | while the average composition of the main cooling zone is

| | Percent |
|---|---|
| Fuel | 25 |
| Structural | 15 |
| Coolant | 60 |

The large fractional value of the aspect area available for coolant flow will tend to reduce the power consumed for pumping the coolant through the primary circuit. Depending on the physical, nuclear, and chemical properties of the materials actually employed in practice, these values may differ considerably from the exemplary ones illustrated.

Figure 16:
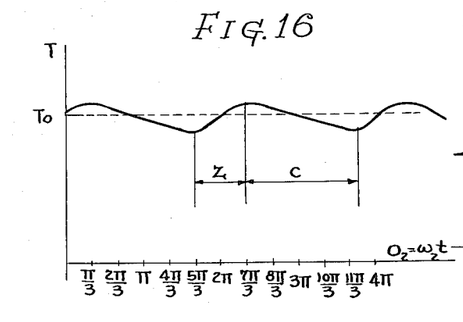
FIGURE 16 gives qualitative curves for the temperature of a specific element of a fuel disc of the fast reactor of FIGURE 11 as it rotates at a constant rate in a steady-state condition.

The steady-state distribution of the fast-reactor fuel element temperatures as a function of position around the axis is given in FIGURE 16 in arbitrary units. Since the fuel discs are rotating at a constant rate, these curves are also typical for the temperature-time dependence for each element of the fuel discs. The sawtooth curve shows a rapid temperature rise over the principal reaction phase in the inner core followed by a less rapid cooling over a main cooling phase in the outer core which lasts approximately twice as long. As in the thermal reactor of FIGURE 1, the temperature amplitude will be reduced by rapid rotation, which also reduces the ill effects of heat cycling in the fuel discs. Moreover, the overall thermal coupling between reaction and cooling zones is obviously higher in the case of high rotary speeds.

Figure 17:
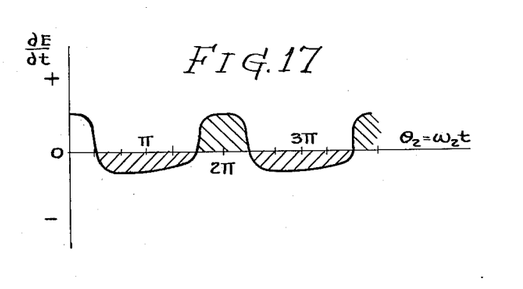
FIGURE 17 shows a qualitative curve of energy gain or loss of a specific small portion of a fuel disc of the fast reactor of FIGURE 11 as it rotates at a constant rate in a steady-state condition.

FIGURE 17 shows the energy balance of an arbitrary element of a fuel disc of the FIGURE 11 fast reactor in a steady-state condition. The total heat generation which occurs during passage through the principal reacting zone in the inner core is equal to the total heat yield mainly confined to the remainder of the cycle and lasting approximately twice as long. The shaded areas in FIGURE 17, indicating the integrated net heat balance within an element of a fuel disc, therefore, are of equal size under steady-state conditions.

Figure 18:
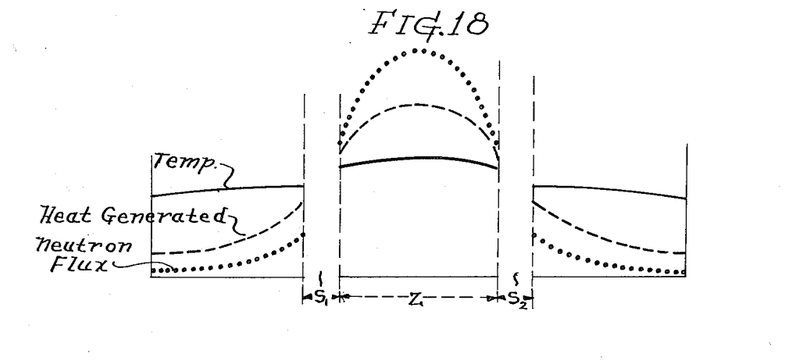
FIGURE 18 gives qualitative curves for generated power, neutron flux, and temperature along the central line of the fuel assembly of the fast reactor of FIGURE 11 in a steady-state condition.

FIGURE 18 indicates how in spite of concentration of virgin neutron flux and power generation in the main reacting zone, the temperature is essentially spread out evenly over the entire fuel assembly of the fast reactor core. The curves present the temperature distribution as well as the magnitudes of power generation and virgin neutron flux along the central line $x—x$ of FIGURE 12.

Figure 19:
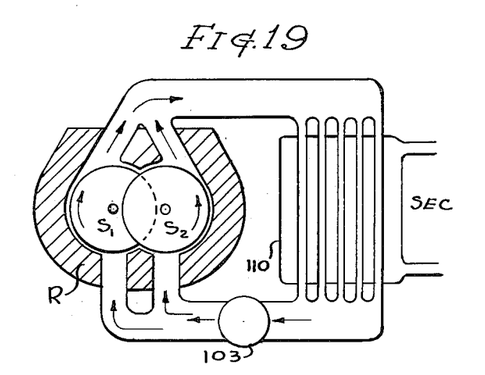
FIGURE 19 is a diagrammatic flow diagram of a fast-neutron reactor according to FIGURE 11, employing a liquid primary coolant, in which circulation is aided by the drag-pumping effect of the rotating fuel discs.

High rotation speeds also offer the additional possibility of applying the kinetic energy imparted to the liquid coolant by the rotary discs, to the circulation of the coolant, although this goes at the expense of counterflux cooling. In other words, as with the FIGURE 1 reactor, it is possible to utilize the drag forces between fuel discs and coolant to supply part of the necessary power required for circulation of the coolant through its circuit. A typical set-up of this nature is sketched in FIGURE 19. In some cases the pump 103 may be eliminated when the fuel-disc drag furnishes sufficient power for the required rate of coolant circulation. The heat exchanger 110 transfers heat energy in the coolant to a secondary circuit.

Figure 20:
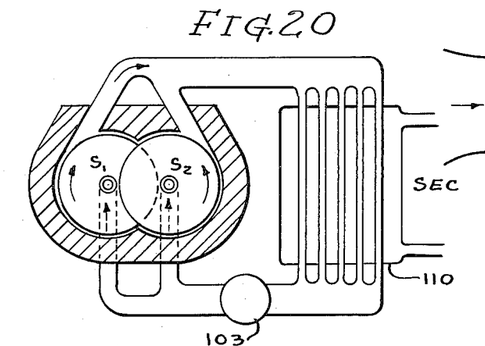
FIGURE 20 is a diagrammatic flow diagram of a fast-neutron reactor according to FIGURE 11, employing a liquid primary coolant, in which the circulation is supported by the centrifugal pumping effect of the rotating fuel discs.

In FIGURE 20 I show that a combination of centrifugal and drag forces may be utilized to provide pumping power in the primary coolant circuits. If the coolant is introduced into the core via hollow shafts $S_1$ and $S_2$ through apertures 105 between the fuel discs (FIGURE 21), the spinning motion of these discs will create a radial flow component in the coolant between the discs, thereby supplying motive power as required for circulation of the coolant through the primary circuit comprising the core, the heat exchanger 110 and the primary coolant pump 103.

Figure 22:
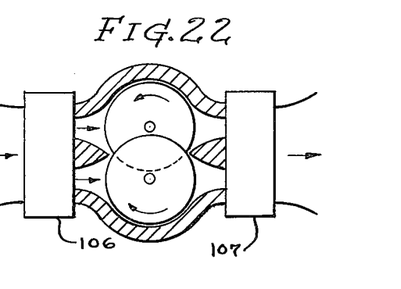
FIGURE 22 is a fragmentary diagrammatic sectional view of a fast-neutron reactor turbine power plant according to the principles of the FIGURE 11 reactor, employing a gaseous working medium heated by contact with the fuel discs.

The main cooling zones $C_1$ and $C_2$ of the FIGURE 11 reactor, with their relatively large effective aspect opening, allow free passage of large amounts of coolant under a small pressure drop. Therefore, my invention, as previously mentioned with reference to FIGURE 10, is particularly suited for application to high-power, gas-cooled reactors. FIGURE 22 depicts a typical configuration whereby a fast reactor of the FIGURE 11 type is utilized as a heat source in a gas turbine power plant with closed or open cycle. The confinement of the greater portion of the coolant gas to the zones $C_1$ and $C_2$ with relatively low neutron flux will help to reduce the neutron-induced radioactivity which, especially in the case of an open air cycle, is particularly desirable. As in FIGURE 10, the compressor in FIGURE 22 is marked 106 and the turbine is marked 107.

Figure 23:
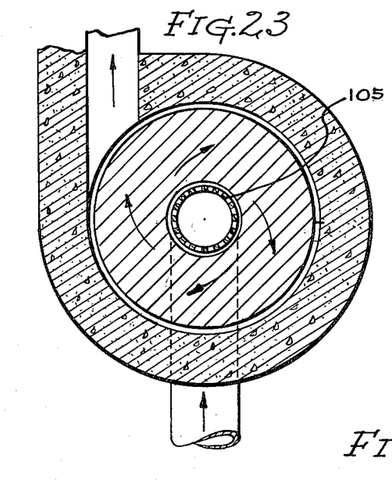
FIGURE 23 sketches an internally cooled thermal reactor in which the rotation of the fuel bearing disc assembly supports the circulation of the primary coolant by means of the centrifugal forces created.
Figure 24:
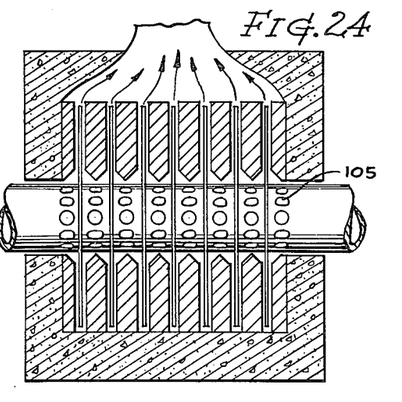
FIGURE 24 is another view of the FIGURE 23 structure, showing its appearance as viewed in section in the plane containing the axis of rotation.

Rotating fuel assemblies with self-pumping properties can, of course, also be used in reactors in which the coolant moves through the reacting part of the core. FIGURES 23 and 24 show such an internally cooled reactor in which the rotation of the fuel assembly whirls the coolant through the clearances between fuel and moderator. A fuel assembly of the general nature of FIGURE 21 may be employed in this case, although any shape of rotary symmetry will do. Whenever the coolant acts at the same time as moderator, impellers may be provided between the fuel discs in order to improve the pumping efficiency. The coolant flow rate is highest near the center shaft, where maximum neutron flux and heat generation exist, while near the perimeter of the fuel discs, where power generation is low, the coolant flow is slowed down as a result of the increasing flow area available.

Figure 25:
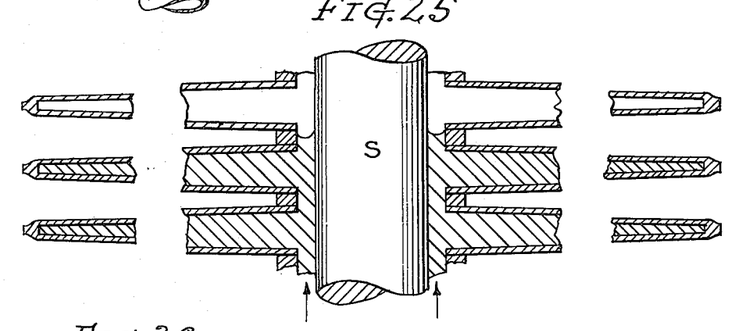
FIGURE 25 is a cross sectional detail of part of a rotary fuel assembly containing liquid fuel encased in a number of parallel discs mounted on a hollow shaft, in the static condition during filling.
Figure 26:
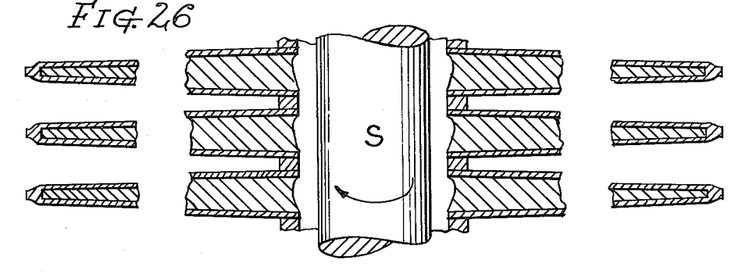
FIGURE 26 is a similar view taken during rotation, after excess fuel in the shaft has been drained off, while the discs retain their filling under the influence of centrifugal forces.

When liquid fuel is employed, encased in hollow fuel discs, additional advantages can be realized by use of my invention. For example, the filling and draining of the fuel discs may be facilitated by slightly tapering the inside walls of the cavities within the discs, as sketched in FIGURES 25 and 26. Filling can be performed by raising the fuel level in the shaft cavity during stand-still of the assembly (FIGURE 25). Once the assembly is rotating, the centrifugal forces will cause the fuel to flow from the shaft cavity into the discs as shown in FIGURE 26. In this condition any considerable lowering of the rate of rotation will cause partial drainage of the fuel discs and resulting decrease of reactivity. This is an important safety feature.

Figure 27:
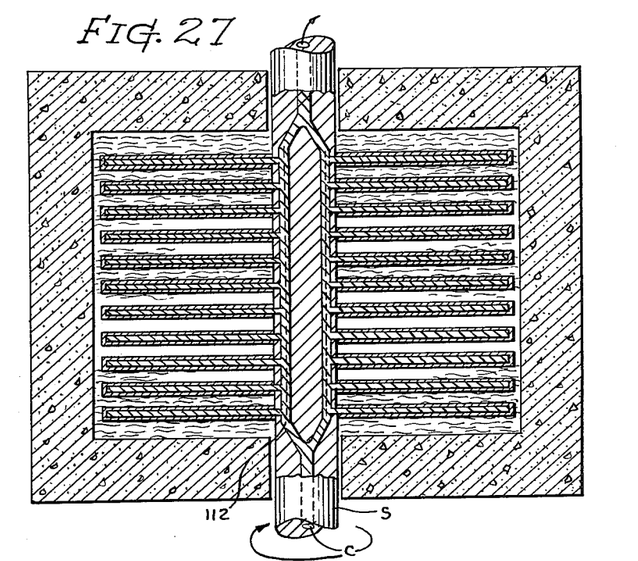
FIGURE 27 depicts in diagrammatic section an internally cooled thermal reactor with rotary fuel assemblies containing liquid fuel, in which the fission products are continuously removed by centrifugal separation within the fuel assembly itself, during operation.

A further important advantage of my invention when used with liquid fuel is that provision may be made for draining off during operation the centermost layer of liquid fuel, at intervals or continuously, in order to remove fission products which have accumulated there as a result of centrifugal segregation. Thus, without the disadvantage of extra fuel holdup in reprocessing loops, continuous centrifugal purification is obtained, permitting a higher burn-up rate and increasing inherent safety by reducing the excess reactivity required to compensate for fission-product poisoning. In FIGURE 27 a simple arrangement is shown as an example of continuous removal of fission products by means of my invention. In that structure, liquid fuel is circulated through a narrow annular cavity C in the shaft S, the cavity 112 being in comunication with the interiors of all the fuel discs. During operation of the reactor, the lighter fission-product atoms, as they are formed in the fuel, tend to work to the central parts of the discs, where they are picked up by the circulating current of liquid fuel in the cavity 112 and are carried out of the reactor, to be replaced by the heavy atoms of fuel and fertile material pumped into cavity 112.

Figure 28:
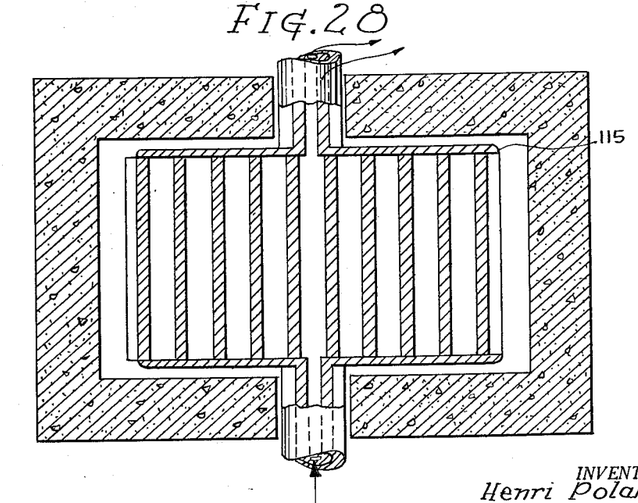
FIGURE 28 shows a reactor in which a body of liquid fuel is rotated by means of a rotary core vessel, with centrifugal separation of fission products as in FIGURE 27, but without the use of a multi-disc fuel assembly.

FIGURE 28 shows how the liquid fuel can be rotated by means of a rotary core vessel to achieve continuous centrifugal separation of fission products from the fuel. This structure does not have a multi-disc shape, the actual "fuel assembly" being entirely a liquid rotary body of fuel, confined within the rotating cylindrical fuel housing 115.

While I have in this specification described and illustrated my invention in a number of embodiments, it is to be understood that they are merely exemplary, and that persons skilled in the art will be able to make many changes and variations in the structures shown without departing from the principles and spirit of my invention. Accordingly, the scope of my invention should be primarily determined from the appended claims.

I claim:

1. In a nuclear reactor the combination comprising a core containing a plurality of disc-shaped, fuel-containing elements, said elements being mounted for rotation about their respective centers in a plurality of spaced parallel planes, means for rotating said elements, means for creating a condition of criticality in said plurality of discs over segments of said discs, said segments progressing around said discs during rotation thereof, coolant means surrounding each of said discs including said critical segments, and means for passing said coolant means around said discs in a direction parallel to the plane of rotation of said discs with the coolant flow rate highest adjacent the center of rotation of said discs.

2. The reactor of claim 1 wherein said plurality of fuel discs are mounted for rotation about a common axis and said means for creating a condition of criticality includes a neutron moderator adjacent each of said discs throughout said critical segment of each of said discs.

3. The reactor of claim 1 wherein said plurality of fuel discs are mounted for rotation about a plurality of parallel axes, and wherein said means for creating a condition of criticality includes the overlapping of a portion of the discs of each of the plurality of axes so that criticality is attained only in the overlapping segments of said discs.

4. The nuclear reactor of claim 1 wherein said disc-shaped elements are hollow, wherein said fuel is a fluid containing fissionable material, and wherein means, communicating with the interior of said hollow elements, is provided for passing said fluid fuel into and out of said disc-shaped elements.

5. The nuclear reactor of claim 1 wherein said disc-shaped fuel elements comprise a solid fissionable material fuel core and cladding enclosing said fuel core, and including a neutron reflector disposed about the critical segment of said discs.

References Cited in the file of this patent

UNITED STATES PATENTS 2,812,304     Wheeler _______________ Nov. 5, 1957